Dec. 11, 1951  J. P. KINTON  2,577,896
STIRRER
Filed Oct. 6, 1950
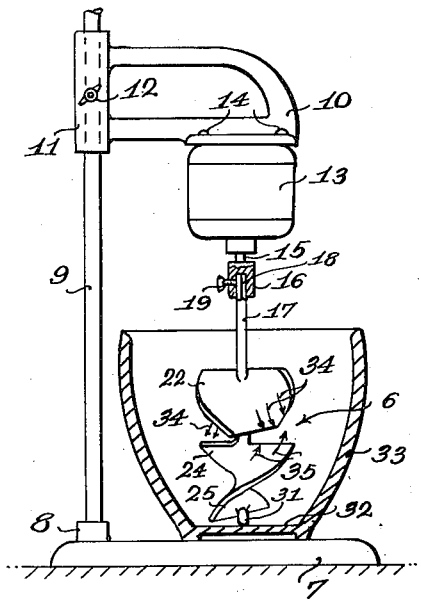
Fig. 1.
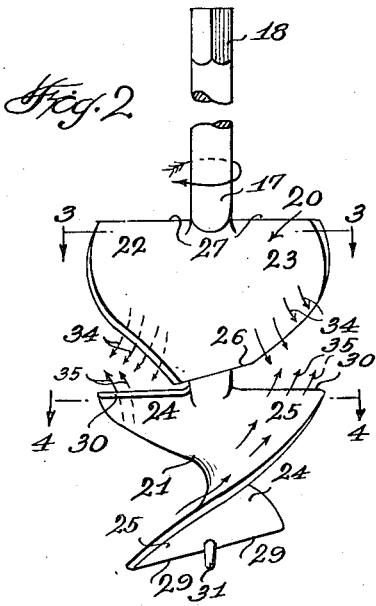
Fig. 2.
Fig. 3.
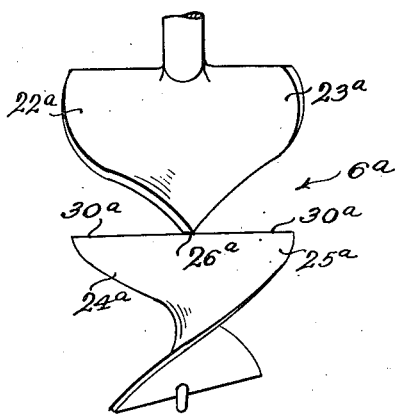
Fig. 5.
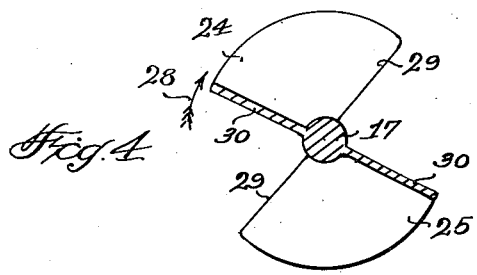
Fig. 4.
Inventor
JAMES P. KINTON
By John N. Randolph
Attorney Patented Dec. 11, 1951

2,577,896

UNITED STATES PATENT OFFICE 2,577,896

STIRRER

James P. Kinton, Lansing, Mich.

Application October 6, 1950, Serial No. 188,837

2 Claims. (Cl. 259—134)

This invention relates to a novel construction of stirrer or beater for mixing food, paint and other liquid and semi-solid material and has for its primary object to provide a beater unit of extremely simple construction whereby the material will not only be agitated but will be displaced in opposite directions longitudinally or axially of the beater for producing a thorough intermingling of the material.

Another and important object of the invention is to provide a more efficient beater or stirrer which may be very economically manufactured and sold, which will be extremely efficient and durable, and which is capable of being much more readily cleaned and maintained in a sanitary condition.

A further object of the invention is to provide a beater or stirrer which may be used for beating liquid or semi-solid material in an open top vessel or container without splashing the material thereby making it unnecessary for the container to be covered during the beating operation.

Various other objects and advantages of the invention will hereinafter become more fully apparent from the following description of the drawing, illustrating a presently preferred embodiment of the invention, and wherein:

Figure 1 is a side elevational view, partly in vertical section, showing one form of the beater in an operative position;

Figure 2 is an enlarged fragmentary side elevational view of the beater unit comprising the invention;

Figures 3 and 4 are horizontal sectional views thereof taken substantially along planes as indicated by the lines 3—3 and 4—4, respectively, of Figure 2, and Figure 5 is a fragmentary side elevational view of a slightly different form of the invention.

Referring more specifically to the drawing, for the purpose of illustrating a preferred application and use of the novel stirrer or beater, designated generally 6 and comprising the invention, in Figure 1 of the drawing a supporting base is shown at 7 provided adjacent one end thereof with an upwardly opening socket 8 receiving therein the lower end of a supporting post 9 which is supported thereby in an upright position and which in turn supports an arm or supporting bracket 10 over the base 7. The arm 10 may be of any suitable construction preferably having a sleeve 11 at one end thereof which is slidably and detachably mounted on the post 9 and adjustably secured thereto by a setscrew or other clamping means 12. A conventional electric motor 13 is secured to the arm 10 by fastenings 14 and depends downwardly therefrom. The motor 13 is provided with a downwardly extending drive shaft 15 which terminates in a downwardly opening socket 16 having a recess of non-circular cross section. The parts 7 to 16, inclusive, are of conventional construction and are illustrated merely to illustrate one application and use of the mixer or beater 6, comprising the invention.

The stirrer or beater 6 includes a shaft 17 having an upper end portion 18 of non-circular cross section adapted to detachably fit in the recess of the socket 16 for keying the shaft 17 to the drive shaft 15 and which may be detachably secured thereto in any suitable manner as by means of a setscrew 19 which is threadedly radially into the socket 16. The shaft 17 is provided with two stirrer sections including the upper stirrer section, designated generally 20 and the lower stirrer section, designated generally 21 which sections are preferably formed integral with the shaft 17 but may be otherwise suitably secured thereto. The sections 20 and 21 are preferably substantially identical each including two corresponding blades comprising the blades 22 and 23 of the upper section 20 and the blades 24 and 25 of the lower section 21. The complementary blades 22 and 23 and 24 and 25 extend outwardly from the shaft 17 radially in substantially opposite directions. Each of said blades is relatively wide in a direction radially of the shaft 17 and relatively long in a direction longitudinally of said shaft and is preferably of the same radial width at its upper and lower ends. Each of the mixer blades is twisted from end-to-end thereof to constitute a portion of a helical convolution, each individual blade constituting preferably slightly less than one-half a convolution so that the bottom edge 26 of each of the blades 22 and 23 is disposed in advance of the top edge 27 of the other blade of the upper section 20, assuming the blades to be turning in a clockwise direction as indicated by the arrow 28 in Figure 3. Thus, the two upper blades 22 and 23 are twisted counterclockwise from their upper edges 27 to their lower edges 26. The lower blades 24 and 25 are twisted to extend circumferentially about the shaft 17 substantially the same distance between their bottom edges 29 and their top edges 30; however, the blades 24 and 25 are twisted in the opposite direction or clockwise, as best seen in Figure 4 and likewise indicated by the arrow 28 thereof so that, assuming that the direction of rotation of the shaft 17 to be clockwise, the bottom edges 29 of the blades 24 and 25 constitute the leading edges of said blades and the top edges 30 the trailing edges thereof with the top edge of each blade 24 and 25 being disposed slightly in advance of the bottom edge 29 of the other blade. The shaft 17 is provided with a terminal 31 which extends slightly below the bottom edges 29 of the lower blades 24 and 25 to prevent said blades from contacting directly with the bottom of a vessel in which the stirrer 6 is mounted, as for example the bottom 32 of the open top container or vessel 33 which is shown supported on the base 7 of Figure 1.

In Figure 1, the shaft end 18 is shown secured in the socket 16 so that the beater 6 is supported below the motor 13 and within the vessel 33 and with the shaft end 31 contacting or substantially contacting the vessel bottom 32. The motor shaft 15 drives the shaft 17 in a clockwise direction as viewed from above so that, assuming the vessel 33 to be filled with a liquid or semi-solid, not shown, adjacent or above the upper edges 27 of the top blades 22 and 23, as the mixer 6 revolves clockwise the material above the lower blades 24 and 25 will be swept downwardly and outwardly by the top blades 22 and 23 in currents moving in the directions as indicated by the arrows 34 in Figures 1 and 2. Accordingly, the material from the top blade 22 will be swept downwardly and outwardly in front of the bottom blade 25 and the material in the top blade 23 will be similarly deflected downwardly and outwardly in advance of the bottom blade 24. At the same time, the material from the bottom blades 24 and 25 which are pitched in the opposite direction will be swept upwardly and outwardly as indicated by the arrows 35 in Figures 1 and 2 so that the material from the bottom blade 25 will be swept outwardly and upwardly in front of the blade 23 and the material from the bottom blade 24 will be swept upwardly and outwardly in front of the top blade 22. Consequently, there will be no splashing of the material, if in liquid form, outwardly of the open top of the vessel 33 and very little surface surging of the liquid since the liquid in the upper half of the vessel will be directed downwardly and away from the surface of the liquid by the top blades 22 and 23 whereas the liquid adjacent the bottom 32 of the vessel will be swept upwardly. Thus, the effective area of intermingling and mixing the material will be adjacent the center of the vessel approximately at the level of the blade edges 26 and 30 and as a result it will be readily apparent that a mixture of different materials of different consistencies wherein one material tends to settle to the bottom may be readily and effectively mixed with another material having lesser specific gravity which would normally collect in the vessel above the heavier material, due to the fact that the heavier material will be displaced upwardly from adjacent the bottom of the vessel while the lighter material will be displaced downwardly to thus accomplish a thorough intermingling of the materials. It will also be apparent that the stirrer 6 is of extremely simple construction enabling it to be very economically manufactured and sold and due to the arrangement of the blades, said stirrer may be easily cleaned even after being utilized for mixing materials such as paint.

Figure 5 illustrates a slightly different form of the stirrer, designated generally 6a and which differs from the stirrer 6 only in that the intermediate portions of the bottom edges 26a of the top blades 22a and 23a are directly in contact with the upper edges 30a of the bottom blades 24a and 25a whereas a slight spacing exists between said adjacent edges 26 and 30 in the stirrer 6 and as best illustrated in Figure 2.

Various other modifications and changes are likewise contemplated and may obviously be resorted to, without departing from the spirit or scope of the invention as hereinafter defined by the appended claims.

I claim as my invention:

1. A stirrer for mixing liquids and semi-solids in a container, comprising a pair of rigidly connected sections disposed in end-to-end relationship relatively to one another, a rotary driven shaft, the axes of the sections being disposed in alignment, the remote end of one of said sections being rigidly secured to an end of the shaft with the axis of the stirrer in alignment with the axis of the shaft whereby the stirrer is supported on said shaft end for rotation therewith about the axis of the sections, each section including a pair of corresponding halves extending radially from the axis of the stirrer and each constituting a stirrer blade, each blade being elongated in a direction longitudinally of the stirrer and stirrer sections, the blades of each section being twisted in the same direction from end-to-end of each blade and each blade having its ends spaced circumferentially of the stirrer a distance defining an arc of approximately 90°, the blades of the different sections being twisted in opposite directions, the remote ends of the blades of the two sections constituting the leading ends thereof when the stirrer is revolved about its longitudinal axis by rotation of the shaft whereby said blades will produce currents for deflecting materials to be mixed toward the adjacent ends of the blades and so that the blades of each section will deflect material toward the blades of the other section and radially outwardly of the stirrer from the adjacent ends of said sections, the adjacent radial ends of the blades of the two sections constituting the trailing ends of said blades and being disposed relatively close to one another with respect to the longitudinal axis of the stirrer, and each of the trailing and leading ends of the blades of each section being disposed in longitudinal alignment with an intermediate portion of a blade of the other section.

2. A stirrer for mixing liquids and semi-solids in a container, comprising a pair of rigidly connected sections disposed in end-to-end relationship relatively to one another, the axes of the sections being disposed in alignment, a rotary driven shaft, the remote end of one of said sections being rigidly secured to an end of the shaft with the axis of the stirrer in alignment with the axis of the shaft whereby the stirrer is supported on said shaft end for rotation therewith about the axis of the stirrer, each section including a pair of corresponding halves extending radially from the axis of the stirrer and each constituting a stirrer blade, each blade being elongated in a direction longitudinally of the stirrer and sections, the blades of each section being twisted in the same direction from end-to-end of each blade and each blade having its ends spaced circumferentially of the stirrer a distance defining an arc of approximately 90°, the blades of the different sections being twisted in opposite directions, the remote ends of the blades of the two sections constituting the leading ends thereof when the stirrer is revolved about its longitudinal axis by rotation of the shaft whereby said blades will produce currents for deflecting materials to be mixed toward the adjacent ends of the blades and so that the blades of each section will deflect material toward the blades of the other section and radially outwardly of the stirrer from the adjacent ends of said sections, the adjacently disposed ends of the blades of the two sections being located in substantially the same radial plane relatively to the longitudinal axis of the stirrer, and the adjacently disposed, trailing ends of the blades of the two sections being disposed substantially at right angles to one another.

JAMES P. KINTON.

REFERENCES CITED

The following references are of record in the file of this patent:

UNITED STATES PATENTS

| Number | Name | Date |
|---|---|---|
| 201,900 | Whitney | Apr. 2, 1878 |
| 296,792 | Smith | Apr. 15, 1884 |
| 1,810,554 | Costakos | June 16, 1931 |
| 1,879,928 | Eakins | Sept. 27, 1932 |
| 2,441,727 | Snow | May 18, 1948 |